US012412973B2

(12) United States Patent
Hsiao et al.

(10) Patent No.: US 12,412,973 B2
(45) Date of Patent: Sep. 9, 2025

(54) WIRELESS DONGLE

(71) Applicant: CHENG UEI PRECISION INDUSTRY CO., LTD., New Taipei (TW)

(72) Inventors: Lan-Yung Hsiao, New Taipei (TW); Ping-Chun Lu, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 18/608,897

(22) Filed: Mar. 18, 2024

(65) Prior Publication Data

US 2025/0007144 A1 Jan. 2, 2025

(30) Foreign Application Priority Data

May 15, 2023 (CN) ......................... 202321160391.4

(51) Int. Cl.
*H01Q 1/22* (2006.01)
*H01Q 1/50* (2006.01)
*H01Q 9/04* (2006.01)

(52) U.S. Cl.
CPC ................. *H01Q 1/22* (2013.01); *H01Q 1/50* (2013.01); *H01Q 9/0407* (2013.01)

(58) Field of Classification Search
CPC ............ H01Q 1/22; H01Q 1/24; H01Q 1/273; H01Q 1/38; H01Q 1/52; H01Q 5/30-40; H01Q 9/04; H01Q 9/42; H05K 2201/10098
See application file for complete search history.

(56) References Cited

U.S. PATENT DOCUMENTS 6,337,666 B1 * 1/2002 Bishop ..................... H01Q 9/40 343/702
9,461,365 B2 * 10/2016 Iellici ....................... H01Q 1/48
9,844,149 B2 * 12/2017 Cariou ..................... H01Q 9/42

* cited by examiner

*Primary Examiner* — Hasan Islam
(74) *Attorney, Agent, or Firm* — Cheng-Ju Chiang

(57) ABSTRACT

A wireless dongle includes a circuit board, a connector, a wireless module and a printed antenna. The circuit board has a first front edge, a first rear edge, a first left edge and a first right edge. The connector is disposed to a middle of a front of the circuit board. The wireless module is disposed to a middle area and a left area of the circuit board. The connector is electrically connected to the wireless module. The printed antenna is positioned at a right area of the circuit board. The printed antenna is a monopole antenna. The wireless module is connected between the connector and the printed antenna. The printed antenna has a feed-in section positioned close to the first rear edge of the circuit board, and a radiation section.

9 Claims, 4 Drawing Sheets

WIRELESS DONGLE

CROSS REFERENCE TO RELATED APPLICATIONS

The present application is based on, and claims priority from, China Patent Application No. 202321160391.4, filed May 15, 2023, the disclosure of which is hereby incorporated by reference herein in its entirety.

BACKGROUND OF THE INVENTION

Field of the Invention

The present invention generally relates to a wireless dongle, and more particularly to a wireless dongle having a printed antenna with a compact layout.

Description of Related Art

With the rapid development of mobile communication in recent years, various mobile devices gradually tend to be wireless. Simultaneously, people expect the mobile devices and peripheral devices to be thinner, lighter and smaller, so that the mobile devices and peripheral devices are easy to be carried. The mobile devices and the peripheral devices are prompted to develop towards miniaturized sizes, in that case, the sizes of the mobile devices and the peripheral devices are smaller and smaller, for example, a size of a wireless adapter is getting smaller and smaller, and an antenna which is disposed inside the wireless adapter must be correspondingly reduced, so a demand for the antenna that is able to work stably in provided frequency bands and has the smaller size is increased.

Therefore, it is necessary to provide a wireless dongle having a printed antenna with a compact layout, the wireless dongle works in a limited space, and the wireless dongle is able to stably work in a predetermined frequency band.

BRIEF SUMMARY OF THE INVENTION

An object of the present invention is to provide a wireless dongle having a compact layout of a printed antenna. The wireless dongle includes a circuit board, a connector, a wireless module and a printed antenna. The circuit board has a first front edge, a first rear edge opposite to the first front edge, a first left edge, and a first right edge opposite to the first left edge. The connector is disposed to a middle of a front of the circuit board, and the connector projects beyond a middle of the first front edge of the circuit board. The wireless module is disposed to a middle area and a left area of the circuit board. The connector is electrically connected to the wireless module. The printed antenna is positioned at a right area of the circuit board. The printed antenna is a monopole antenna. The wireless module is connected between the connector and the printed antenna. The wireless module is disposed between the printed antenna and the first left edge of the circuit board. The printed antenna is disposed between the wireless module, and the first right edge of the circuit board. The printed antenna is arranged away from the connector. The printed antenna has a feed-in section positioned close to the first rear edge of the circuit board, and a radiation section. The feed-in section is connected to a right rear corner of the wireless module. The radiation section is horizontally extended rightward from a right end of the feed-in section along the first rear edge of the circuit board, then is bent frontward and is extended towards the first front edge of the circuit board, later is bent rightward and is horizontally extended towards the first right edge of the circuit board and is further bent rearward and is longitudinally extended close to the first rear edge of the circuit board. A second rear edge of the radiation section is separated from the first rear edge of the circuit board by a first clearance, a second front edge of the radiation section is separated from the first front edge of the circuit board by a second clearance, an outer edge of the radiation section is separated from the first right edge of the circuit board by the first clearance, the second clearance is greater than the first clearance, an extending path of a front portion of the radiation section forms in an inverted U shape, a tail end of the radiation section is located at a right rear corner of the circuit board.

Another object of the present invention is to provide a wireless dongle. The wireless dongle includes a circuit board, a connector, a wireless module and a printed antenna. The circuit board has a first front edge, a first rear edge opposite to the first front edge, a first left edge, and a first right edge opposite to the first left edge. The connector is disposed to a middle of a front of the circuit board, and a front of the connector projects beyond a middle of the first front edge of the circuit board. The wireless module is disposed to a middle area and a left area of the circuit board. A rear of the connector is disposed to a front of the wireless module. The wireless module contains a plurality of circuits. The plurality of the circuits include a first wireless unit and a plurality of second wireless units. The first wireless unit is disposed to a right front corner of the wireless module. The first wireless unit and the plurality of the second wireless units surround the rear of the connector. The connector is electrically connected to the wireless module. The printed antenna is positioned at a right area of the circuit board. The printed antenna is a monopole antenna. The wireless module is connected between the connector and the printed antenna. The printed antenna has a feed-in section positioned close to the first rear edge of the circuit board, and a radiation section. The feed-in section is connected to a right rear corner of the wireless module. The radiation section is horizontally extended rightward from a right end of the feed-in section, then is bent frontward and is extended towards the first front edge of the circuit board, later is bent rightward and is horizontally extended towards the first right edge of the circuit board and is further bent rearward and is longitudinally extended close to the first rear edge of the circuit board. A second rear edge of the radiation section is separated from the first rear edge of the circuit board by a first clearance, a second front edge of the radiation section is separated from the first front edge of the circuit board by a second clearance, an outer edge of the radiation section is separated from the first right edge of the circuit board by the first clearance, the second clearance is greater than the first clearance, a front portion of the radiation section is inverted U-shaped, two facing surfaces of the inverted U-shaped front portion of the radiation section are separated by a third clearance, a tail end of the radiation section is located at a right rear corner of the circuit board.

Another object of the present invention is to provide a wireless dongle. The wireless dongle includes a circuit board, a connector, a wireless module and a printed antenna. The circuit board has a first front edge, a first rear edge opposite to the first front edge, a first left edge, and a first right edge opposite to the first left edge. The connector is disposed to a middle of a front of the circuit board, and the connector projects beyond a middle of the first front edge of the circuit board. The wireless module is disposed to a middle area and a left area of the circuit board. A rear of the connector is disposed to a front of the wireless module. The connector is electrically connected to the wireless module. The wireless module contains a plurality of circuits. The plurality of the circuits surround the rear of the connector. The printed antenna is positioned at a right area of the circuit board. The printed antenna is a monopole antenna. The wireless module is connected between the connector and the printed antenna. The plurality of the circuits are disposed between the connector and the printed antenna. The wireless module is disposed between the printed antenna, and the first left edge of the circuit board. The printed antenna is disposed between the wireless module, and the first right edge of the circuit board. The printed antenna is arranged away from the connector. The printed antenna has a feed-in section positioned close to the first rear edge of the circuit board, and a radiation section. The feed-in section is connected to a right rear corner of the wireless module. The plurality of the circuits are located to one side of the feed-in section. The radiation section is horizontally extended rightward from a right end of the feed-in section along the first rear edge of the circuit board, then is bent frontward and is extended towards the first front edge of the circuit board, later is bent rightward and is horizontally extended towards the first right edge of the circuit board and is further bent rearward and is longitudinally extended close to the first rear edge of the circuit board. A second rear edge of the radiation section is separated from the first rear edge of the circuit board by a first clearance, a second front edge of the radiation section is separated from the first front edge of the circuit board by a second clearance, an outer edge of the radiation section is separated from the first right edge of the circuit board by the first clearance, the second clearance is greater than the first clearance, an extending path of a front portion of the radiation section forms in an inverted U shape, a tail end of the radiation section is located at a right rear corner of the circuit board.

As described above, the wireless dongle has a compact layout of the printed antenna, so the printed antenna of the wireless dongle works in a limited space, and the printed antenna of the wireless dongle is able to stably work in a predetermined frequency band. As a result, the wireless dongle is adapted to a miniaturization development trend of electronic products, and a wireless development trend of the electronic products.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
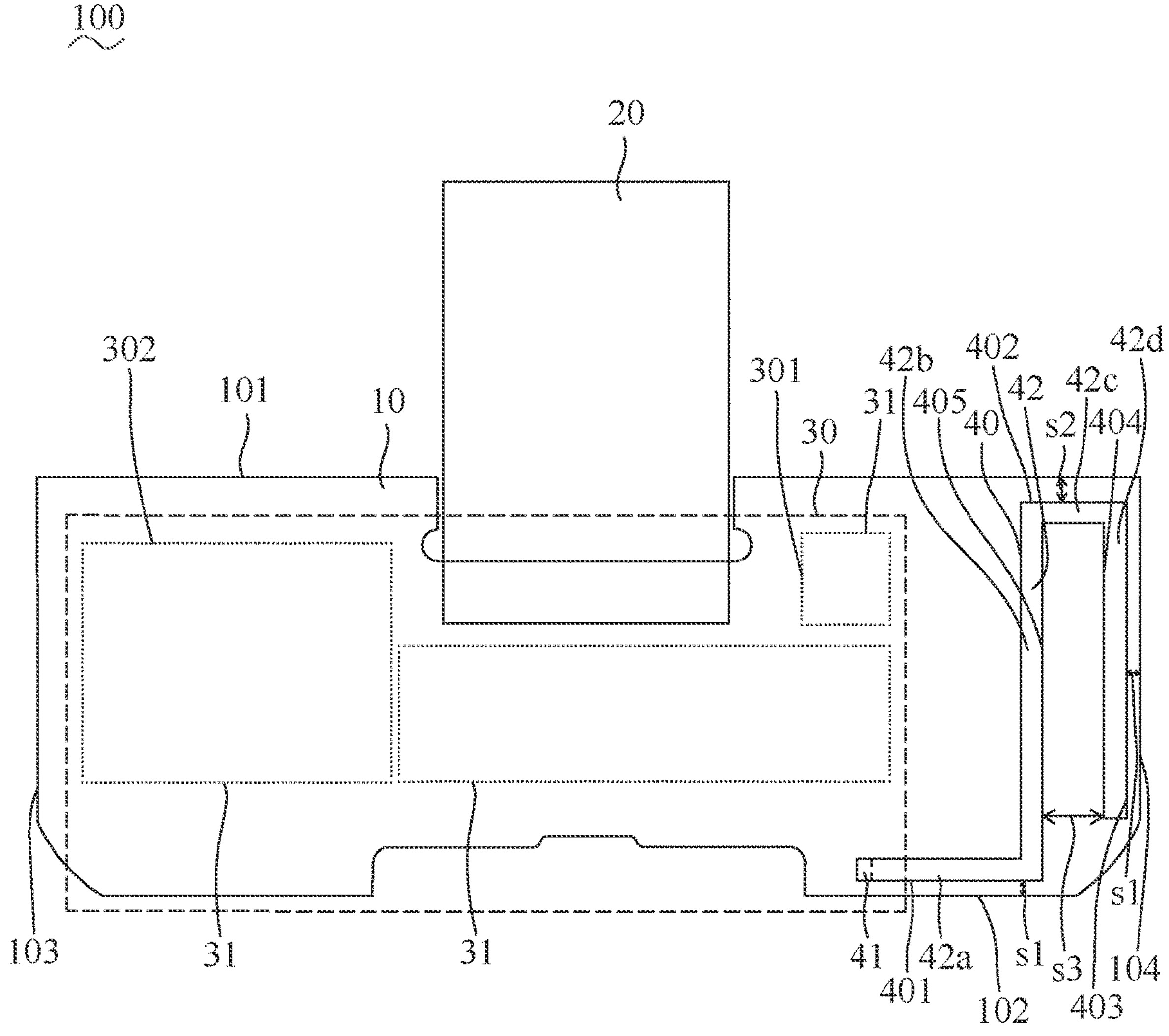
FIG. 1 is a front diagram of a wireless dongle according to a preferred embodiment of the present invention.

Referring to FIG. 1, a wireless dongle 100 in accordance with a preferred embodiment of the present invention is shown. The wireless dongle 100 includes a circuit board 10, a connector 20, a wireless module 30 and a printed antenna 40. The connector 20, the wireless module 30 and the printed antenna 40 are all arranged on the circuit board 10. The connector 20 is electrically connected to the wireless module 30, and the wireless module 30 is electrically connected to the printed antenna 40. The wireless module 30 is connected between the connector 20 and the printed antenna 40.

The circuit board 10 is formed in a rectangular shape. The circuit board 10 has two opposite long edges and two opposite short edges. In this preferred embodiment, the circuit board 10 has a first front edge 101, a first rear edge 102 opposite to the first front edge 101, a first left edge 103, and a first right edge 104 opposite to the first left edge 103. The first left edge 103 is connected between two left ends of the first front edge 101 and the first rear edge 102, and the first right edge 104 connected between two right ends of the first front edge 101 and the first rear edge 102. The first front edge 101 and the first rear edge 102 of the circuit board 10 are the two opposite long edges. The first left edge 103 and the first right edge 104 of the circuit board 10 are the two opposite short edges.

The connector 20 is disposed to a middle of a front of the circuit board 10, and a front of the connector 20 projects beyond a middle of the first front edge 101 of the circuit board 10. The wireless module 30 is disposed to a middle area and a left area of the circuit board 10. The printed antenna 40 is positioned at a right area of the circuit board 10. The wireless module 30 is disposed between the printed antenna 40 and the first left edge 103 of the circuit board 10. Specifically, the wireless module 30 is disposed between a middle of the printed antenna 40, and the first left edge 103 of the circuit board 10. The printed antenna 40 is disposed between the wireless module 30, and the first right edge 104 of the circuit board 10. The printed antenna 40 is arranged away from the connector 20.

After a user inserts the wireless dongle 100 into a mobile device (not shown), the mobile device is able to proceed with wireless communication via the wireless dongle 100. The mobile device is a notebook or a smart phone. In this preferred embodiment, a distance between the mobile device and the printed antenna 40, and a distance between the mobile device and a metal shell of the connector 20 all affect characteristics of the printed antenna 40, such as a voltage standing wave ratio, and a field pattern and reflection loss, so under a premise that a layout of the printed antenna 40 is cooperated with a circuit layout of the wireless module 30, the layout of the printed antenna 40 need be far away from the metal shell of the connector 20 and the mobile device.

The wireless module 30 is able to be a Bluetooth module or a 2.4G module. The wireless module 30 contains a plurality of circuits 31 to proceed with data transmission and data conversion, and the plurality of the circuits 31 are selected from a group consisting of micro-controllers, filters and sensors. The plurality of the circuits 31 are able to be the micro-controllers, the filters, the sensors, different type circuits, or different type components, etc. A quantity of the circuits 31 shown in FIG. 1 are just schematic, and the quantity of the circuits 31 should be without being limited to the quantity of the circuits 31 which is shown in FIG. 1. The plurality of the circuits 31 include a first wireless unit 301 and a plurality of second wireless units 302. The first wireless unit 301 is disposed to a right front corner of the wireless module 30. A rear of the connector 20 is disposed to a front of the wireless module 30. In this preferred embodiment, the plurality of the circuits 31 are disposed between the connector 20 and the printed antenna 40. The plurality of the circuits 31 surround the rear of the connector 20. The first wireless unit 301 and the plurality of the second wireless units 302 surround the rear of the connector 20.

The printed antenna 40 is a monopole antenna. The printed antenna 40 has a feed-in section 41 and a radiation section 42. The feed-in section 41 is positioned close to the first rear edge 102 of the circuit board 10. The feed-in section 41 is connected to a right rear corner of the wireless module 30. The radiation section 42 is horizontally extended rightward from a right end of the feed-in section 41 along the first rear edge 102 of the circuit board 10, then is bent frontward and is extended towards the first front edge 101 of the circuit board 10, later is bent rightward and is horizontally extended towards the first right edge 104 of the circuit board 10 and is further bent rearward and is longitudinally extended close to the first rear edge 102 of the circuit board 10. The plurality of the circuits 31 are located to one side of the feed-in section 41.

A second rear edge 401 of the radiation section 42 is separated from the first rear edge 102 of the circuit board 10 by a first clearance s1. A second front edge 402 of the radiation section 42 is separated from the first front edge 101 of the circuit board 10 by a second clearance s2. An outer edge 403 of the radiation section 42 is separated from the first right edge 104 of the circuit board 10 by the first clearance s1. The second clearance s2 is greater than the first clearance s1. An extending path of a front portion of the radiation section 42 forms in an inverted U shape. The front portion of the radiation section 42 is inverted U-shaped. Two facing surfaces of the inverted U-shaped front portion of the radiation section 42 are separated by a third clearance s3. A tail end of the radiation section 42 is located at a right rear corner of the circuit board 10.

Referring to FIG. 1 again, in this preferred embodiment, the radiation section 42 includes a first zone 42*a* straightly extended rightward from the right end of the feed-in section 41, a second zone 42*b* straightly extended frontward from a tail end of the first zone 42*a*, a third zone 42*c* straightly extended rightward from a tail end of the second zone 42*b*, and a fourth zone 42*d* straightly extended rearward from a tail end of the third zone 42*c*. A second left edge 404 of the fourth zone 42*d* is separated from a second right edge 405 of the second zone 42*b* by the third clearance s3. A tail end of the fourth zone 42*d* is located at the right rear corner of the circuit board 10.

The second rear edge 401 of the first zone 42*a* of the radiation section 42 is separated from the first rear edge 102 of the circuit board 10 by the first clearance s1. The second front edge 402 of the third zone 42*c* of the radiation section 42 is separated from the first front edge 101 of the circuit board 10 by the second clearance s2. The outer edge 403 of the fourth zone 42*d* of the radiation section 42 is separated from the first right edge 104 of the circuit board 10 by the first clearance s1. The first zone 42*a* and the third zone 42*c* are extended horizontally, and the first zone 42*a* and the third zone 42*c* are formed in transverse strip shapes. An extending path of the first zone 42*a* is parallel to an extending path of the third zone 42*c*. The first zone 42*a* is paralleled to the third zone 42*c*. The first zone 42*a* and the third zone 42*c* are parallel to the first front edge 101 and the first rear edge 102 of the circuit board 10. The second zone 42*b* and the fourth zone 42*d* are extended longitudinally, and the second zone 42*b* and the fourth zone 42*d* are formed in longitudinal strip shapes. An extending path of the second zone 42*b* is paralleled to an extending path of the fourth zone 42*d*. The second zone 42*b* is paralleled to the fourth zone 42*d*.

According to the above-mentioned description configuration, the feed-in section 41 and the radiation section 42 of the printed antenna 40 are alternately transmitted, and electric fields and magnetic fields of the feed-in section 41 and the radiation section 42 are interacted to oscillate electromagnetic waves in a frequency band which is ranged from 2.4 GHz to 2.5 GHz. In practice, the first clearance s1 is 0.2 mm, the second clearance s2 is approximately equal to the distance between the mobile device and the printed antenna 40, the second clearance s2 is 0.5 mm, and the third clearance s3 is 2 mm.

When the printed antenna 40 of the wireless dongle 100 according to the present invention is used in wireless communication, a current from the wireless module 30 is fed by the feed-in section 41. The current passes through the radiation section 42, the electromagnetic waves in the frequency band which is ranged from 2.4 GHz to 2.5 GHz are oscillated. Thus, the printed antenna 40 of the wireless dongle 100 works in a limited space, and the printed antenna 40 of the wireless dongle 100 is able to stably work in a predetermined frequency band.

Figure 2:
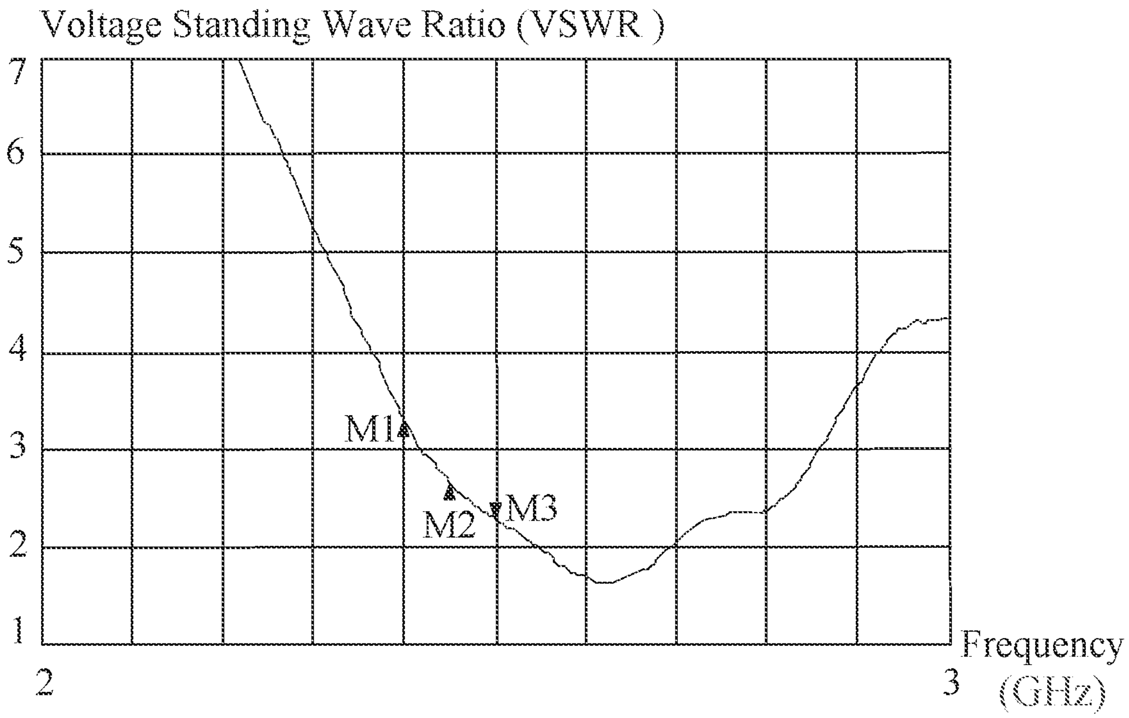
FIG. 2 is a voltage standing wave ratio (VSWR) chart of a printed antenna of the wireless dongle according to the preferred embodiment of the present invention.
Figure 3:
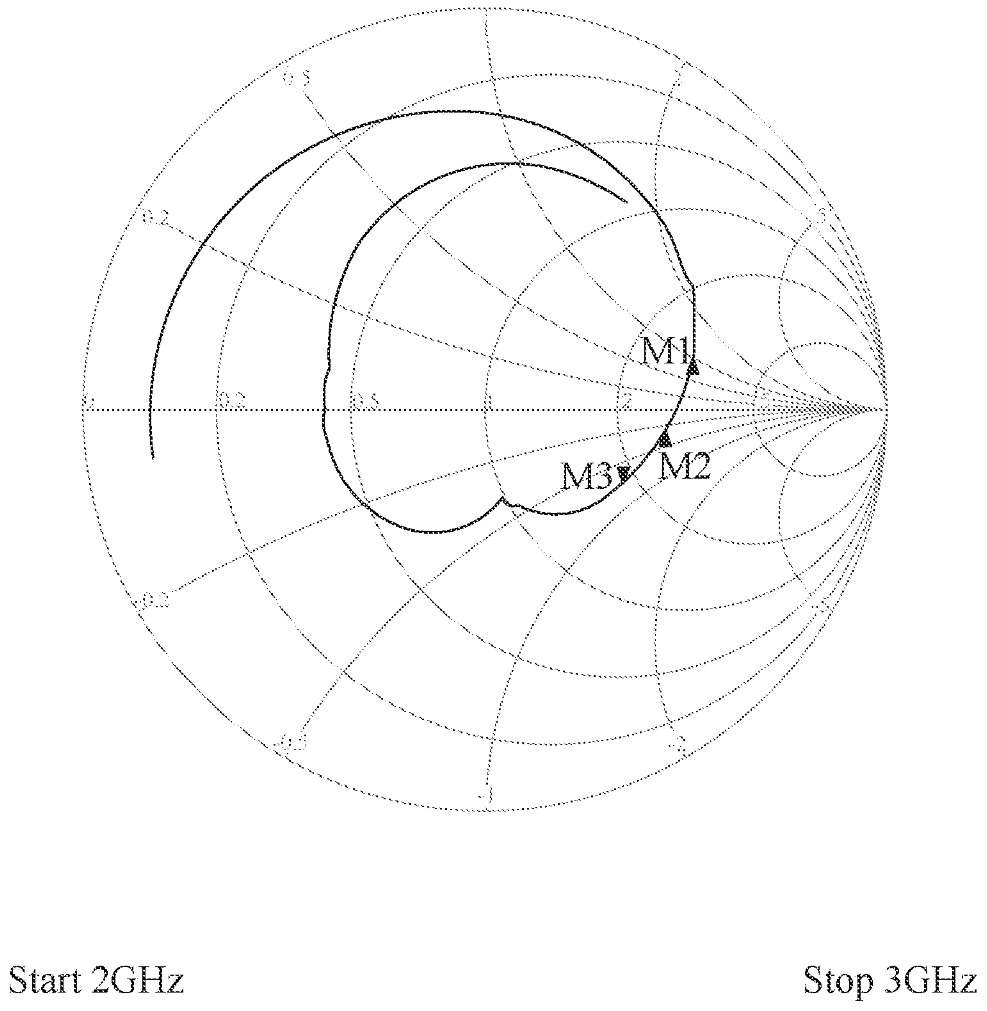
FIG. 3 is a smith chart of the printed antenna of the wireless dongle according to the preferred embodiment of the present invention.

Referring to FIG. 1 to FIG. 3, a voltage standing wave ratio (VSWR) chart of the printed antenna 40 of the wireless dongle 100 according to the present invention is shown in FIG. 2. A smith chart of the printed antenna 40 of the wireless dongle 100 according to the present invention is shown in FIG. 3. When the printed antenna 40 is operated at 2.4 GHz, a VSWR value of the printed antenna 40 is 3.2842 which is shown at a position M1 of FIG. 2 and FIG. 3. When the printed antenna 40 is operated at 2.45 GHZ, a VSWR value of the printed antenna 40 is 2.6379 which is shown at a position M2 of FIG. 2 and FIG. 3. When the printed antenna 40 is operated at 2.5 GHZ, a VSWR value of the printed antenna 40 is 2.2588 which is shown at a position M3 of FIG. 2 and FIG. 3. Therefore, the printed antenna 40 of the wireless dongle 100 according to the present invention is able to be stably operated in the frequency band which is ranged from 2.4 GHz to 2.5 GHZ.

Figure 4:
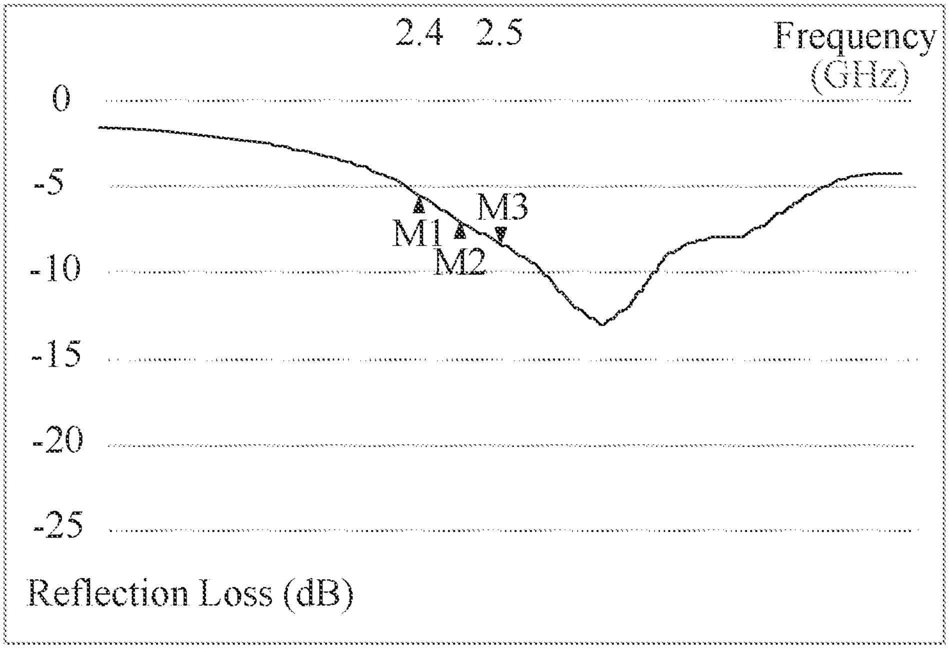
FIG. 4 is a return loss chart of the printed antenna of the wireless dongle according to the preferred embodiment of the present invention.

Referring to FIG. 1 and FIG. 4, when the printed antenna 40 of the wireless dongle 100 is operated in the frequency band which is ranged from 2.4 GHz to 2.5 GHZ, a return loss of a bandwidth of the printed antenna 40 is roughly within −10 dB, a loss degree of the printed antenna 40 is small, and a radiation energy of the printed antenna 40 is large.

As described above, the wireless dongle 100 has the printed antenna 40 with a compact layout, so the printed antenna 40 of the wireless dongle 100 works in the limited space, and the printed antenna 40 of the wireless dongle 100 is able to stably work in the predetermined frequency band. As a result, the wireless dongle 100 is adapted to a miniaturization development trend of electronic products, and a wireless development trend of the electronic products.

Though the present invention is disclosed as the above-mentioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. A wireless dongle, comprising:

a circuit board having a first front edge, a first rear edge opposite to the first front edge, a first left edge, and a first right edge opposite to the first left edge;

a connector disposed on a middle of a front of the circuit board, the connector projecting beyond a middle of the first front edge of the circuit board;

a wireless module disposed on a middle area and a left area of the circuit board, the connector being electrically connected to the wireless module; and a printed antenna positioned at a right area of the circuit board, the printed antenna being a monopole antenna, the wireless module being connected between the connector and the printed antenna, the wireless module being disposed between the printed antenna and the first left edge of the circuit board, the printed antenna being disposed between the wireless module and the first right edge of the circuit board, the printed antenna being arranged away from the connector, the printed antenna having:

a feed-in section positioned close to the first rear edge of the circuit board, the feed-in section being connected to a right rear corner of the wireless module; and a radiation section horizontally extended rightward from a right end of the feed-in section along the first rear edge of the circuit board, then being bent frontward and extended towards the first front edge of the circuit board, later being bent rightward and horizontally extended towards the first right edge of the circuit board and being further bent rearward and longitudinally extended close to the first rear edge of the circuit board;

wherein a second rear edge of the radiation section is separated from the first rear edge of the circuit board by a first clearance, a second front edge of the radiation section is separated from the first front edge of the circuit board by a second clearance, an outer edge of the radiation section is separated from the first right edge of the circuit board by the first clearance, the second clearance is greater than the first clearance, an extending path of a front portion of the radiation section forms in an inverted U shape, and a tail end of the radiation section is located at a right rear corner of the circuit board.

2. The wireless dongle as claimed in claim 1, wherein the radiation section includes a first zone straightly extended rightward from the right end of the feed-in section, a second zone straightly extended frontward from a tail end of the first zone, a third zone straightly extended rightward from a tail end of the second zone, and a fourth zone straightly extended rearward from a tail end of the third zone, a second left edge of the fourth zone is separated from a second right edge of the second zone by a third clearance.

3. The wireless dongle as claimed in claim 2, wherein the second rear edge of the first zone of the radiation section is separated from the first rear edge of the circuit board by the first clearance, the second front edge of the third zone of the radiation section is separated from the first front edge of the circuit board by the second clearance, the outer edge of the fourth zone of the radiation section is separated from the first right edge of the circuit board by the first clearance.

4. The wireless dongle as claimed in claim 2, wherein a tail end of the fourth zone is located at the right rear corner of the circuit board.

5. The wireless dongle as claimed in claim 2, wherein the first zone and the third zone are extended horizontally, and the first zone and the third zone are formed in transverse strip shapes, the first zone is paralleled to the third zone, the first zone and the third zone are parallel to the first front edge and the first rear edge of the circuit board.

6. The wireless dongle as claimed in claim 2, wherein the second zone and the fourth zone are extended longitudinally, and the second zone and the fourth zone are formed in longitudinal strip shapes, the second zone is paralleled to the fourth zone.

7. The wireless dongle as claimed in claim 2, wherein an extending path of the first zone is parallel to an extending path of the third zone, an extending path of the second zone is paralleled to an extending path of the fourth zone.

8. A wireless dongle, comprising:

a circuit board having a first front edge, a first rear edge opposite to the first front edge, a first left edge, and a first right edge opposite to the first left edge;

a connector disposed on a middle of a front of the circuit board, a front of the connector projecting beyond a middle of the first front edge of the circuit board;

a wireless module disposed on a middle area and a left area of the circuit board, a rear of the connector being disposed to a front of the wireless module, the wireless module containing a plurality of circuits, the plurality of the circuits including a first wireless unit and a plurality of second wireless units, the first wireless unit being disposed to a right front corner of the wireless module, the first wireless unit and the plurality of the second wireless units surrounding the rear of the connector, the connector being electrically connected to the wireless module; and a printed antenna positioned at a right area of the circuit board, the printed antenna being a monopole antenna, the wireless module being connected between the connector and the printed antenna, the printed antenna having:

a feed-in section positioned close to the first rear edge of the circuit board, the feed-in section being connected to a right rear corner of the wireless module; and a radiation section horizontally extended rightward from a right end of the feed-in section, then being bent frontward and extended towards the first front edge of the circuit board, later being bent rightward and horizontally extended towards the first right edge of the circuit board and being further bent rearward and longitudinally extended close to the first rear edge of the circuit board;

wherein a second rear edge of the radiation section is separated from the first rear edge of the circuit board by a first clearance, a second front edge of the radiation section is separated from the first front edge of the circuit board by a second clearance, an outer edge of the radiation section is separated from the first right edge of the circuit board by the first clearance, the second clearance is greater than the first clearance, a front portion of the radiation section is inverted U-shaped, two facing surfaces of the inverted U-shaped front portion of the radiation section are separated by a third clearance, and a tail end of the radiation section is located at a right rear corner of the circuit board.

9. A wireless dongle, comprising:

a circuit board having a first front edge, a first rear edge opposite to the first front edge, a first left edge, and a first right edge opposite to the first left edge;

a connector disposed on a middle of a front of the circuit board, the connector projecting beyond a middle of the first front edge of the circuit board;

a wireless module disposed on a middle area and a left area of the circuit board, a rear of the connector being disposed to a front of the wireless module, the connector being electrically connected to the wireless module, the wireless module containing a plurality of circuits, the plurality of the circuits surrounding the rear of the connector; and a printed antenna positioned at a right area of the circuit board, the printed antenna being a monopole antenna, the wireless module being connected between the connector and the printed antenna, the plurality of the circuits being disposed between the connector and the printed antenna, the wireless module being disposed between the printed antenna and the first left edge of the circuit board, the printed antenna being disposed between the wireless module and the first right edge of the circuit board, the printed antenna being arranged away from the connector, the printed antenna having:

a feed-in section positioned close to the first rear edge of the circuit board, the feed-in section being connected to a right rear corner of the wireless module, the plurality of the circuits being located to one side of the feed-in section; and a radiation section horizontally extended rightward from a right end of the feed-in section along the first rear edge of the circuit board, then being bent frontward and extended towards the first front edge of the circuit board, later being bent rightward and horizontally extended towards the first right edge of the circuit board and being further bent rearward and longitudinally extended close to the first rear edge of the circuit board;

wherein a second rear edge of the radiation section is separated from the first rear edge of the circuit board by a first clearance, a second front edge of the radiation section is separated from the first front edge of the circuit board by a second clearance, an outer edge of the radiation section is separated from the first right edge of the circuit board by the first clearance, the second clearance is greater than the first clearance, an extending path of a front portion of the radiation section forms in an inverted U shape, and a tail end of the radiation section is located at a right rear corner of the circuit board.

* * * * *